United States Patent [19]

Urban

[11] 3,864,096

[45] Feb. 4, 1975

[54] PROCESS FOR CONVERTING CELLULOSE

[75] Inventor: Peter Urban, Northbrook, Ill.

[73] Assignee: Universal Oil Products Company, Des Plaines, Ill.

[22] Filed: Jan. 4, 1973

[21] Appl. No.: 321,112

[52] U.S. Cl. .............................. 44/50, 44/62, 201/25
[51] Int. Cl. .............................................. C10j 1/00
[58] Field of Search ..................... 44/50, 62; 201/25

[56] References Cited
UNITED STATES PATENTS

| | | | |
|---|---|---|---|
| 276,981 | 5/1883 | Pradon | 44/62 |
| 1,889,836 | 12/1932 | Lowry et al. | 44/62 |
| 2,016,170 | 10/1935 | Mallett | 44/50 X |
| 2,246,973 | 6/1941 | Camilli et al. | 44/62 X |

*Primary Examiner*—Paul F. Shaver
*Attorney, Agent, or Firm*—James R. Hoatson, Jr.; Thomas K. McBride; William H. Page, II

[57] ABSTRACT

A process for converting cellulose to a normally liquid oil which includes contacting cellulose with water, a reducing gas and an ammonia-producing compound at particular conditions of temperature and pressure to insure a liquid water phase at conversion conditions employed. The reducing gas may be carbon monoxide, hydrogen, or a mixture thereof.

6 Claims, No Drawings

PROCESS FOR CONVERTING CELLULOSE

BACKGROUND OF INVENTION

This invention relates to a process for converting cellulose to a hydrocarbonaceous, normally liquid oil.

This invention also relates to a process for converting municipal waste materials into valuable hydrocarbonaceous compounds.

It is known that cellulose can be converted into a hydrocarbonaceous tar by treatment with water and carbon monoxide at elevated temperatures and pressures. The conversion of cellulose to a hydrocarbonaceous liquid is advantageous to two aspects in particular. First, this type of conversion provides a method for reducing the volume of the enormous amounts of municipal refuse which is normally buried or burned in order to effect disposal. Further, burning and/or burying refuse is wasteful of the hydrocarbonaceous material, primarily in the form of cellulose, which are present in such refuse. By converting the cellulose components of typical municipal waste matter into valuable liquid hydrocarbonaceous products, the volume of the refuse can be diminished by as much as 90 percent. The hydrocarbonaceous products recovered may be employed as fuel or as feed stocks in processes for producing chemical derivatives. Previously disclosed methods for converting cellulose using water and a reducing gas are able to achieve only undesirably low rates of conversion. Prior art methods are hampered in that hydrogen has been found inactive when used as the reducing gas in place of carbon monoxide, whereas carbon monoxide is an expensive reducing gas relative to a carbon monoxide-hydrogen mixture such as synthesis gas.

SUMMARY OF INVENTION

An object of the present invention is to provide a process for converting cellulose to normally liquid hydrocarbonaceous material. Another object of the present invention is to provide a process for reducing the volume of cellulose-containing municipal refuse. A further object of the present invention is to provide a process for converting cellulose to a hydrocarbonaceous liquid utilizing an ammonia-producing compound as a catalyst. Another object of the present invention is to provide a process for converting cellulose to a hydrocarbonaceous liquid utilizing hydrogen, or a mixture thereof with carbon monoxide, as a reducing gas to provide a conversion equally as good as the conversion obtained utilizing carbon monoxide alone as the reducing gas in the conversion operation.

In an embodiment, the present invention relates to a process for converting cellulose to a normally liquid hydrocarbonaceous product which comprises contacting the cellulose with water, a reducing gas, and an ammonia-producing compound at conversion conditions including a temperature of about 200°C. to about 375°C. and a pressure sufficient to maintain at least a portion of the water as a liquid phase, and recovering the hydrocarbonaceous product from the resulting mixture.

I have found that by employing an ammonia-producing compound in combination with water and a reducing gas, and by utilizing a temperature and pressure combination in the conversion operation whereby the water is maintained at least partially as a liquid, cellulose may be converted into liquid hydrocarbonaceous oil in high yields. Further, using the process of the present invention, hydrogen may be substituted as the reducing gas in place of carbon monoxide with excellent results, so that a mixture of carbon monoxide and hydrogen, such as synthesis gas, can be economically employed in the present process.

DETAILED DESCRIPTION OF INVENTION

Any cellulose-containing material may be employed as the feed stock in the present process. For example, paper, cardboard, wood and other conventional vegetable matter which is normally found in municipal refuse may be employed. It is contemplated that the present process may be performed using a mixture of cellulose-containing materials with refractory materials such as metals, plastics, etc., whereby the cellulose can be liquefied and easily separated from the refractory solid materials by decantation. The refractory materials may then be discarded or disposed of in any conventional manner.

The catalytic ammonia-producing compounds which may be employed in the present process particularly ammonia, ammonium hydroxide and ammonium carbonate. Nitrogen-containing organic compounds such as hexamethylenetetramine, formamide, ammonium acetate, guanidine, biuret, and ammonium salts of phenolic acids such as phenol, resorcinol, etc., may also be employed.

The reducing gas employed in the present process may be pure hydrogen or pure carbon monoxide. A mixture of these gases is also suitable. The reducing gas may be commingled with one or more gases or vapors which are relatively inert in the conversion operation, including nitrogen, carbon dioxide, etc. One convenient, suitable source of the reducing gas is a synthesis gas produced by reaction of carbon or hydrocarbons with steam to produce carbon monoxide and hydrogen. A variety of methods for producing a synthesis gas suitable for use in the present process are well known in the art.

Conversion conditions, in the present process, include a temperature of about 200°C. to about 375°C. and a pressure at least sufficient to provide a liquid water phase at the desired temperature. For example, in an operation wherein it is desired to maintain a temperature of about 200°C., a pressure of at least about 20 atmospheres is maintained at conversion conditions. In high temperature operations, e.g., 350°–375°C., a pressure of about 135 atmospheres to about 220 atmospheres or more is maintained. In the temperature range between about 200°C. and about 300°C., the primary utility of the process of the present invention is in the reduction of the volume of municipal refuse. At this temperature range, the oil produced from a cellulose is heavy and viscous and approximately of the same consistency as a crude oil. At higher temperature operations, between about 300°C. and about 375°C., the oil produced is lighter and may be used directly as a feed stock to provide petrochemicals, etc., without the necessity of such further processing as may be necessary in order to so utilize the oil obtained at lower temperature operation.

The amount of water employed in the present process in contact with the cellulose at conversion conditions is between about 10 wt.% and about 1,000 wt.% based on the amount of cellulose to be converted. Good results are obtained when the amount of water is between about 50 wt.% and about 200 wt.% of the cellulose. The amount of ammonia or the ammonia-producing compound utilized in contact with the cellulose is sufficient to provide a concentration of about 5 wt.% to about 30 wt.% based on the cellulose. A concentration of about 20 wt.% to about 30 wt.% is particularly preferred. The ammonia-producing compound may conveniently be employed as an aqueous solution of, for example, ammonium hydroxide or ammonium carbonate in the water employed. When this method is utilized, it is preferred to maintain a concentration of about 10 wt.% or more of the ammonia-producing compound in solution in the water. The superatmospheric pressures employed at conversion conditions in the present process may be wholly supplied by the reducing gas, or may be supplied, in part, by inert gases, water vapor, etc. In any case, the partial pressure of the reducing gas is maintained at least about 10 percent of the total pressure. The amount of the reducing gas employed is generally about 0.5 standard cubic feet (SCF) to about 175 SCF per pound of cellulose in the matter to be processed. Preferably the amount of the reducing gas utilized is about 20 SCF to about 75 SCF per pound of cellulose.

The process of the present invention may be performed in a batch-type operation or a continuous-type operation. When a batch-type operation is utilized, fixed amounts of the cellulose-containing material, water, the ammonia-producing compound and the reducing gas are charged to a suitable reactor such as an autoclave. The reactants are contacted in the reactor for a period of time sufficient to produce the conversion of the cellulose to the normally liquid oil and then the mixture in the reactor is withdrawn and the desired hydrocarbonaceous products are separated from the any remaining solids and water and recovered. A suitable contact time in a batch-type operation is about 30 minutes to about 300 minutes, preferably about 60 minutes to about 200 minutes. In a continuous operation, the cellulose-containing material, water, the ammonia-producing compound and the reducing gas are continuously charged to a suitable reactor capable of internal agitation, and contacted therein. The mixture of the hydrocarbonaceous product, water, reducing gas and any remaining solids, is continuously withdrawn from the reactor and the desired hydrocarbonaceous product is separated and recovered. A suitable liquid hourly space velocity in a continuous-type operation (volume of the reactor divided by the total volume of cellulose-containing materials, water, and reducing gas charged per hour) of about 0.1 to about 1 may be employed, and a liquid hourly space velocity of about 0.25 to about 0.5 is particularly preferred. The reactor utilized in the present process may be any suitable vessel which can maintain the cellulose-containing materials, water and reducing gas at the desired temperature and pressure in order to provide sufficient conversion. For example, a conventional rocking autoclave is a suitable reactor for use in a batchtype operation. A variety of suitable vessels for use as the reactor are known in the art. Preferably, the reactor includes some means for admixing the cellulose-containing materials with the water and reducing gas by stirring or other agitation.

The mixture recovered after the conversion operation, in addition to the desired liquid hydrocarbonaceous product will also contain water, which will generally be in a separate phase from the hydrocarbonaceous product. Thus, the hydrocarbonaceous product may conveniently be separated from the water and from any remaining solid materials such as metals, plastics, etc., by simple mechanical separation of the solids and the water. The water phase thus recovered may be recirculated to the liquefaction step for further use. Similarly, any reducing gas which is not consumed during the conversion operation may be recovered and recirculated to the reactor. The water phase recovered from the operation contains some water-soluble organic materials and also contains the unconsumed ammonia charged to the operation or produced therein from an ammonia-producing compound. The water may thus be evaporated leaving behind an organic, ammonia-containing material which is useful as an agricultural fertilizer.

The following Examples are presented in order to illustrate particular embodiments of the process of the present invention. The Examples are presented for the purpose of illustration only, and are not intended as limitations on the generally broad scope of the invention. Those skilled in the art will recognize from the foregoing and from the Examples hereinafter presented that many variations and embodiments within the scope of the present invention are apparent.

EXAMPLE I

In order to illustrate the process of the present invention, the conversion of commercially available paper towel to a liquid hydrocarbonaceous oil was undertaken. One hundred grams of commercial paper towel was placed in an 850 cc. rocking autoclave. 272 cc. of water and 28 grams of $NH_4OH$ were also placed in the autoclave. The autoclave was sealed and sufficient carbon monoxide was charged to provide 70 atmospheres carbon monoxide pressure in the autoclave. The content of the autoclave were then agitated and heated to a temperature of 250°C. The pressure observed was 150 atmospheres. The contents of the autoclave were agitated at 250°C. for 7 hours. The autoclave was then cooled and excess pressure was released. The contents were removed and were observed to comprise a water phase and an oil phase. The oil phase was decanted to separated it from the water phase and the oil was then weighed. It was found that the oil weighed 14 grams, corresponding to a conversion of 23 percent based on the carbon in the paper towels originally placed in the autoclave.

EXAMPLE II

In this example, a mixture of hydrogen and carbon monoxide was employed as the reducing gas. 100 grams of the same commercially available paper towels was placed in the 850 cc. rocking autoclave. 200 grams of water and 28 grams of $NH_4OH$ were also placed in the autoclave. The autoclave was sealed and sufficient hydrogen was charged to provide 35 atmospheres hydrogen pressure. Sufficient carbon monoxide was then charged to provide a carbon monoxide pressure of 35 atmospheres. The autoclave was heated to a temperature of 300°C. and a pressure of 241 atmospheres was observed. The contents of the autoclave were agitated at this temperature for 4 hours, and then the contents were cooled and excess pressure was released. The remaining contents of the autoclave were then removed and they were observed to comprise an oil phase and a water phase. The oil phase was separated from the water phase by decantation and analyzed. The oil phase was found to comprise 73.8 wt.% carbon and 8.4 wt.% hydrogen. The water phase was also recovered and found to contain organic water-soluble material. The water was evaporated and it was found that 13 grams of organic water-soluble residue remained. The combined amount of carbon in the oil phase and in the organic water-soluble materials corresponded to a conversion of 48 percent of the original paper charged to the autoclave.

EXAMPLE III

In this Example, a mixture of hydrogen and carbon monoxide was utilized as the reducing gas. However, the hydrogen-carbon monoxide was charged at a very low initial pressure to illustrate the flexibility of conversion conditions in the present process. In this Example, 100 grams of the commercially available paper towels was charged to the 850 cc. autoclave. 200 grams of water and 28 grams of $NH_4OH$ were also placed in the autoclave. The autoclave was sealed and sufficient hydrogen was charged to provide a hydrogen pressure of 1 atmosphere in the autoclave. Sufficient carbon monoxide was then charged to provide a carbon monoxide pressure of 1 atmosphere in the autoclave, corresponding to a total pressure of 3 atmospheres. The contents of the autoclave were then heated to a temperature of 300°C. The pressure was observed to be 120 atmospheres. The contents of the autoclave were agitated at this temperature for 4 hours. The autoclave was then cooled to room temperature and excess pressure was released. The remaining contents of the autoclave were removed and were again found to comprise a water phase and an oil phase. In this run, the oil phase was observed to be very happy and tacky, similar to a tar. The oil phase was separated from a water phase by decantation and the oil phase was then weighed. It was found that 36 grams of oil were recovered in this run. The organic materials in the water phase were also determined by evaporation of the water. It was found that 6 grams of water-soluble organic materials were obtained.

EXAMPLE IV

In this run, 100 grams of the same paper towels, 200 grams of water, and 28 grams of $NH_4OH$ were placed in the 850 cc. autoclave. In this run, carbon monoxide alone was used as the reducing gas in order to make a comparison using hydrogen alone in a following Example. The autoclave was sealed after introduction of the water, paper and ammonium hydroxide. Sufficient carbon monoxide was charged to the autoclave to provide a carbon monoxide pressure of 10 atmospheres. The autoclave was then heated to a temperature of 300°C. and the contents thereof agitated. The pressure observed was 120 atmospheres. After 4 hours of agitation at 300°C., the contents of the autoclave were cooled to room temperature and excess pressure was released. The contents of the autoclave were removed and observed to comprise an oil phase and a water phase. The oil phase was separated by decantation and weighed. The oil was found to weigh 35 grams.

EXAMPLE V

In this run, hydrogen alone was used as the reducing gas in order to make a comparison with the run using only carbon monoxide which was performed in Example IV. In this run, 100 grams of the paper towels, 200 grams of water and 28 grams of $NH_4OH$ were placed in the 850 cc. autoclave. The autoclave was then sealed and sufficient hydrogen was charged to provide a hydrogen pressure of 10 atmospheres. The contents of the autoclave were then heated to 300°C. and agitated. The pressure was observed to be 138 atmospheres. The contents of the autoclave were agitated at this temperature for 4 hours. The temperature was then reduced to room temperature and excess pressure was released. The contents of the autoclave were removed and observed to comprise an oil phase and a water phase. The oil was separated by decantation and weighed. It was found to contain 29 grams of oil. The orgnaic materials which were soluble in the water were also determined. The water was evaporated and the residue was weighed, and found to weigh 5.8 grams.

EXAMPLE VI

In this Example, $(NH_4)_2CO_3$ was utilized in place of ammonia as the ammonia-producing compound employed as the catalyst. In this run, 100 grams of the same paper towels utilized in the foregoing Examples were placed in the 850 cc. autoclave. 50 Grams of $(NH_4)_2CO_3$ and 200 cc. of water were also placed in the autoclave. The autoclave was sealed and sufficient carbon monoxide was charged to provide 5 atmospheres carbon monoxide pressure in the autoclave. Sufficient hydrogen was then charged to provide 5 atmospheres of hydrogen pressure in the autoclave. The contents of the autoclave were then heated to a temperature of 300°C. and agitated. The pressure was observed to be 136 atmospheres. The contents of the autoclave were agitated at this temperature for 4 hours and then the temperature was reduced to room temperature and the excess pressure in the autoclave was released. The remaining, liquid contents of the autoclave were removed therefrom and found to comprise an oil phase and a water phase. The oil phase was separated by decantation, weighed, and found to contain 29 grams of hydrocarabonaceous oil.

EXAMPLE VII

In this Example, a previously known catalyst, $NaHCO_3$, was employed using hydrogen as the reducing gas, in order to demonstrate that hydrogen is not useful as a reducing gas without the use of ammonia or an ammonia-producing compound as the catalyst in the conversion operation. In this run, 100 grams of the commercial paper towels was placed in the 850 cc. autoclave. 50 Grams of $NaHCO_3$ and 200 cc. of water were also placed in the autoclave. The autoclave was then sealed and sufficient hydrogen gas was introduced to provide a hydrogen pressure in the autoclave of 10 atmospheres. The autoclave was then heated to a temperature of 300°C. and agitated. The pressure was observed to be 175 atmospheres. After agitation at this temperature for 4 hours, the temperature of the contents of the autoclave was reduced to room temperature and excess pressure was released. The contents of the autoclave were then removed and examined. The paper towels were found to have been converted to a solid black material, but no visible hydrocarbonaceous liquid phase was observed, and no water-soluble organic materials were found.

From the foregoing, it is apparent that the process of the present invention provides a novel and superior method for converting cellulose into a valuable hydrocarbonaceous oil which may be employed as a fuel or as a feed stock to provide valuable chemical derivatives. It is also apparent that the present invention provides a surprising and superior method for converting cellulose-containing materials, in that hydrogen gas may be employed in place of, or in combination with, a carbon monoxide as the reducing gas in the present process in contrast to prior art processes utilizing water and a reducing gas in which only carbon monoxide has been found to be effective as a reducing gas. It is also clear from the foregoing that the present process provides a valuable method for radically reducing the volume of municipal refuse by converting the cellulose-containing components of such refuse to a valuable hydrocarbonaceous product which can be easily separated from the solid, unconverted components of such refuse and utilized as a fuel, while the remaining refuse, substantially reduced in volume, may be disposed of in a conventional manner.

I claim as my invention:

1. A process for converting cellulose to a normally liquid hydrocarbonaceous product which comprises contacting paper with water, a reducing gas and ammonia at conversion conditions including a temperature of about 200°C. to about 375°C. and a pressure sufficient to maintain at least a portion of the water as a liquid phase, and recovering the hydrocarbonaceous product from the resulting mixture.

2. A process according to claim 1 wherein said reducing gas comprises hydrogen.

3. A process according to claim 1 wherein said reducing gas comprises carbon monoxide.

4. A process according to claim 1 wherein ammonium hydroxide is used to form said ammonia in situ.

5. A process according to claim 1 wherein ammonium carbonate or ammonium bicarbonate is used to form said ammonia in situ.

6. A process according to claim 1 wherein said conversion conditions include a temperature of about 300°C. to about 375°C. and a pressure of 100 atmospheres to about 150 atmospheres or more.

* * * * *